United States Patent Office 3,428,698
Patented Feb. 18, 1969

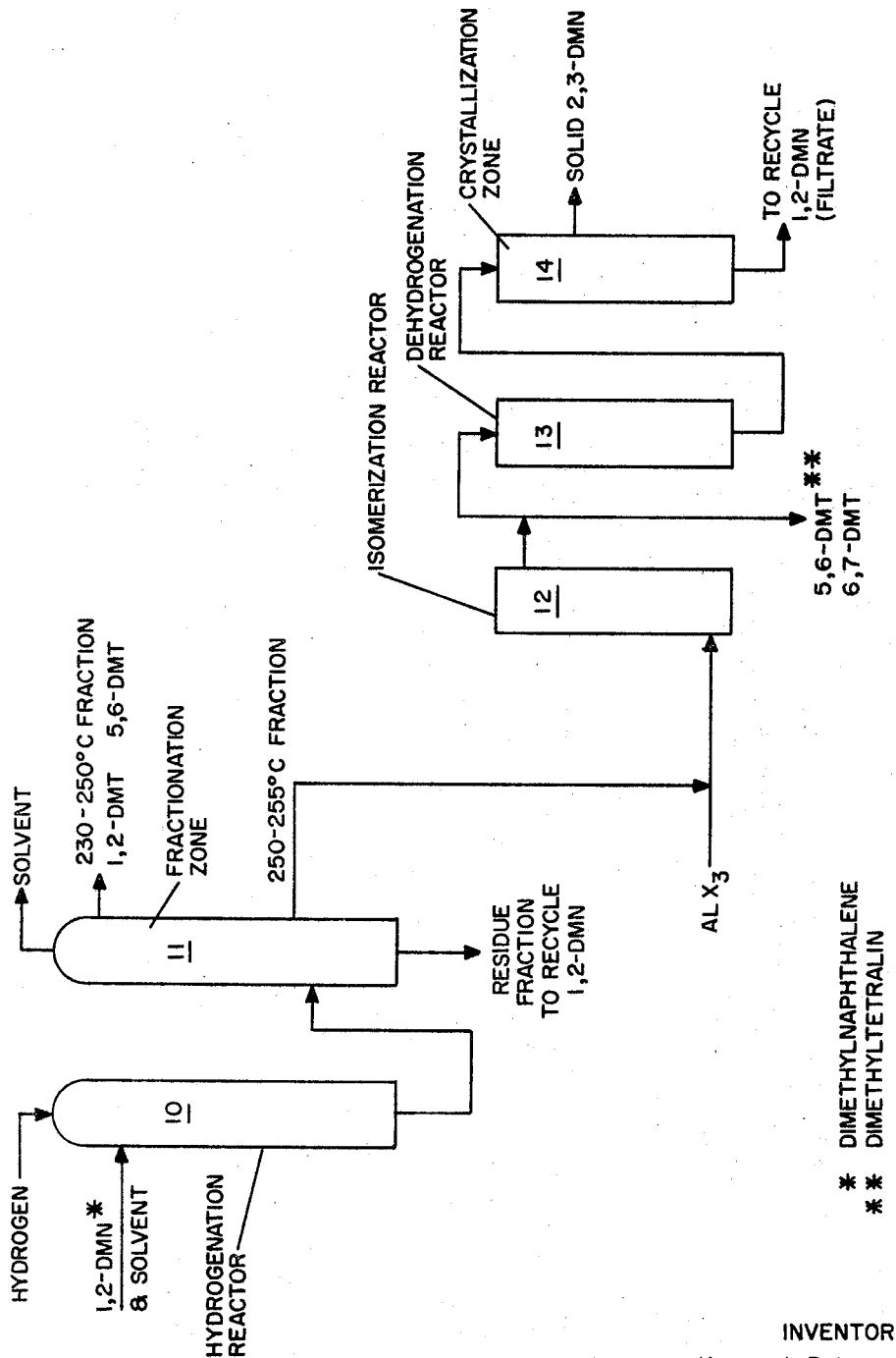

---

3,428,698
PRODUCTION OF 6,7-DIMETHYLTETRALIN AND
2,3-DIMETHYLNAPHTHALENE
Henry J. Peterson, Wilmington, Del., assignor to Sun Oil
Company, Philadelphia, Pa., a corporation of New
Jersey
Filed July 28, 1967, Ser. No. 656,848
U.S. Cl. 260—668                                      7 Claims
Int. Cl. C07c 5/28, 7/02, 5/18

ABSTRACT OF THE DISCLOSURE

Preparation of 2,3-dimethylnaphthalene from 1,2-dimethylnaphthalene comprising the partial reduction of 1,2-dimethylnaphthalene to 5,6-dimethyltetralin and 1,2-dimethyltetralin, fractionation of the mixture to recover 5,6-dimethyltetralin, isomerization of 5,6-dimethyltetralin in the presence of an aluminum halide catalyst to yield a mixture of 6,7-dimethyltetralin and 5,6-dimethyltetralin, dehydrogenation of the mixture to yield 2,3-dimethylnaphthalene and 1,2-dimethylnaphthalene and recovering pure 2,3-dimethylnaphthalene by crystallization and separation of 2,3-dimethylnaphthalene from 1,2-dimethylnaphthalene.

BACKGROUND OF THE INVENTION 2,3-dimethylnaphthalene and 6,7-dimethyltetralin are hydrocarbons that can be oxidized to polycarboxylic acids or anhydrides which are useful chemicals for preparing condensation polymers with certain glycols and polyhydric compounds. The oxidation of 2,3-dimethylnaphthalene to 2,3-naphthalene dicarboxylic acid or anhydride can be accomplished using aqueous sodium dichromate or in vapor phase with air over a vanadium catalyst in a manner similar to the oxidation of o-xylene to phthalic anhydride, 2,3-naphthalene dicarboxylic anhydride can be reacted with glycols to form polymers useful in the paint industry.

6,7-dimethyltetralin can be oxidized with an excess of 30–60% aqueous nitric acid at a temperature of 160–220° C. to form pyromellitic acid (1,2,4,5-benzene tetracarboxylic acid) or pyromellitic dianhydride which is widely used in the manufacture of polyimides. Polyimides prepared from pyromellitic anyhdride, and a polymethylene diamine have excellent high temperature properties. 6,7-dimethyltetralin has not been readily available as a chemical intermediate because its preparation has been dependent upon the partial hydrogenation of 2,3-dimethylnaphthalene, another chemical not readily available. Allen and Craig in J. Am. Chem. Soc., 70, 2792 (1948) have described the partial reduction of 2,3-dimethylnaphthalene to 6,7-dimethyltetralin using a Raney nickel catalyst.

2,3-dimethylnaphthalene may be recovered from a 510–520° F. fraction of an aromatic concentrate derived from the catalytic cracking of petroleum hydrocarbons as described by Allen et al. in U.S. Patent No. 3,235,615. Synthetic methods for the preparation of 2,3-dimethylnaphthalene have been described by Bailey et al. in J. Inst. Petr., 33, 503–26 (1947). Also, 1,3-dimethylnaphthalene and 1,4-dimethylnaphthalene can be isomerized to 2,3-dimethylnaphthalene using a HF-BF$_3$ catalyst as shown by Suld et al. in U.S. Patent No. 3,109,036. In addition, Suld et al. have shown that 1,2-dimethylnaphthalene cannot be isomerized to 2,3-dimethylnaphthalene under the conditions used for isomerizing 1,3-dimethylnaphthalene and 1,4-dimethylnaphthalene to 2,3-dimethylnaphthalene.

SUMMARY OF THE INVENTION

I have found that by carefully controlling the reaction conditions 5,6-dimethyltetralin can be isomerized with aluminum chloride or bromide catalysts to yield 6,7-dimethyltetralin in yields of 85–95%. These results were unexpected since Smith and Lo in J. Am. Chem. Soc., 70, 2209–15 (1948) have shown that 6,7-dimethyltetralin is isomerized to 5,6-dimethyltetralin in the presence of sulfuric acid. Thus as a consequence of this invention it is possible to convert 1,2-dimethylnaphthalene to 6,7-dimethyltetralin or to 2,3-dimethylnaphthalene.

This novel isomerization procedure can be used in accordance with the invention for the conversion of 1,2-dimethylnaphthalene to 2,3-dimethylnaphthalene. The process involves first a step of partial hydrogenation of 1,2-dimethylnaphthalene to 5,6-dimethyltetralin and 1,2-dimethyltetralin, fractional distillation of the mixture to yield a fraction rich in 5,6-dimethyltetralin, isomerization of the 5,6-dimethyltetralin with an activated aluminum halide catalyst to yield a product containing a major amount of 6,7-dimethyltetralin and a minor amount of 5,6-dimethyltetralin, dehydrogenation of said dimethyltetralin mixture to form a mixture of 1,2-dimethylnaphthalene and 2,3-dimethylnaphthalene, and selective crystallization of the mixture to obtain 2,3-dimethylnaphthalene in relatively pure form.

DESCRIPTION OF THE INVENTION

The invention is described with reference to the accompanying drawing which is a schematic flowsheet illustrating the process for producing 6,7-dimethyltetralin and 2,3-dimethylnaphthalene from 1,2-dimethylnaphthalene. Numeral 10 designates a hydrogenation reactor containing a catalyst in which 1,2-dimethylnapthalene is partially hydrogenated in the presence of a solvent to a mixture of 1,2-dimethyltetralin and 5,6-dimethyltetralin. The product from partial hydrogenation passes into fractionation zone 11 where the solvent is removed and the product separated into (a) a fraction mainly boiling in the range of 230–250° C., rich in 1,2-dimethyltetralin and containing a small amount of 5,6-dimethyltetralin, (b) fraction mainly boiling in the range of 250–255° C. containing substantially pure 5,6-dimethyltetralin and (c) a residue fraction containing unconverted 1,2-dimethylnaphthalene. The residue fraction can be recycled. The 250–255° C. fraction from zone 11 passes to the isomerization reactor 12 where aluminum halide is added and the 5,6-dimethyltetralin is isomerized to a mixture of 5,6-dimethyltetralin and 6,7-dimethyltetralin. After neutralization and drying, this product can be used without additional processing for oxidation or it can be passed to reactor 13 where it is dehydrogenated in the presence of a dehydrogenation catalyst to yield a mixture of 2,3-dimethylnaphthalene and 1,2-dimethylnaphthalene which is chilled in crystallization zone 14 to yield solid 2,3-dimethylnaphthalene and 1,2-dimethylnaphthalene. The latter can be recycled to the partial hydrogenation step.

The following is a specific example of a partial hydrogenation procedure for converting 1,2-dimethylnaphthalene to 5,6-dimethyltetralin. This example is in accordance with the procedure described by Arnold and Craig, J. Am. Chem. Soc., 70, 2792 (1948): to 6.24 kg. of 1,2-dimethylnaphthalene in 30 liters of 95% ethanol in a glass-lined autoclave were added 400 grams of Raney nickel. A hydrogen pressure was applied, and absorption of two moles of hydrogen was complete in one hour at 110° C. and a pressure of 1000 p.s.i.g. After removing the catalyst by filtration, the filtrate was fractionated in a forty-plate column at a reflux ratio of 40:1. Three fractions were collected. The first fraction containing 1,2-dimethyltetralin distilled over the range of 230–250° C. The second fraction, which distilled over the range of 250–255° C., was pure 5,6-dimethyltetralin. The bottoms fraction was mainly 1,2-dimethylnaphthalene with a minor amount of 5,6-dimethyltetralin. The 5,6-dimethyltetralin fraction corresponded to a yield of 88%.

The partial hydrogenation of 1,2-dimethylnaphthalene to 5,6-dimethyltetralin can also be accomplished with similar results using a continuous flow reactor. 1,2-dimethylnaphthalene diluted with two volumes of heptane are passed over a sulfided nickel oxide-molybdenum oxide-alumina catalyst. The catalyst can be sulfided by passing a mixture of hydrogen sulfide (2%) and hydrogen (98%) over the catalyst at 450° F. The conditions of hydrogenation are: temperature—650° F., hydrogen pressure—500 p.s.i.g., space rate—2 volumes of charge per volume of catalyst per hour.

In the isomerization of 5,6-dimethyltetralin to 6,7-dimethyltetralin in high yield the catalyst system and temperature are particularly important factor variables. Satisfactory catalysts for use at temperatures of 0–70° C. and a reaction time of 0.1–50 hours are aluminum chloride or aluminum bromide preferably activated with a small amount of water, hydrogen chloride, hydrogen bromide or other activators known in the art. At higher temperatures 5,7-dimethyltetralin and products of disproportionation are formed. Attempts to use boron trifluoride-hydrogen fluoride as a catalyst for the isomerization of 5,6-dimethyltetralin to 6,7-dimethyltetralin were unsatisfactory. This catalyst system is much less specific and gives 5,7-dimethyltetralin in substantial and even major amounts at room temperature.

A series of runs was made to illustrate the isomerization reaction using various reaction conditions.

Example I

To a five gallon glass-lined stirred autoclave was added 7 kg. of 5,6-dimethyltetralin and 140 grams of anhydrous aluminum chloride which had been allowed to pick up 0.2 gram of atmospheric moisture. The mixture was stirred at 20° C. for 18 hours during which time samples were taken periodically for vapor phase chromatographic analyses. The reactor was drained into an ice-hydrochloric acid-water mixture, the product was extracted with hexane and dried, and the solvent was then removed by distillation. The product was found to contain 83.5% 6,7-dimethyltetralin and 16.5% 5,6-dimethyltetralin. The following table shows the course of the isomerization reaction as a function of time at 20° C.

| Time, min. | 5,6-dimethyl-tetralin, percent | 6,7-dimethyl-tetralin, percent |
|---|---|---|
| 0 | 99.2 | 0 |
| 2 | 88 | 12 |
| 6 | 55 | 45 |
| 11 | 48 | 52 |
| 16 | 36 | 64 |
| 21 | 32 | 68 |
| 26 | 24 | 76 |
| 31 | 26 | 74 |
| 36 | 22 | 78 |
| *18 | 16.5 | 83.5 |

*Hours.

Example II

The isomerization reaction was carried out at 50° C. instead of 20° C. for a period of two hours. In other respects the reaction conditions were the same as used in Example I. Vapor phase chromatographic analyses of the product showed the presence of 84% 6,7-dimethyltetralin, 13% 5,6-dimethyltetralin and 3% 5,7-dimethyltetralin.

Example III

The isomerization reaction was carried out as described in Example I except that 160 grams of aluminum bromide and 20 grams of hydrogen bromide were used as the catalyst for a period of 15 hours. The product was found to contain 85% 6,7-dimethyltetralin and 15% 5,6-dimethyltetralin.

Example IV 5,6-dimethyltetralin was isomerized in a series of three small scale experiments at room temperature (28° C.) using a 100 ml. Hoke bomb as the reactor and mechanical shaker for agitation. The catalyst was $HF-BF_3$. Five volumes of hydrogen fluoride were used for each volume of hydrocarbon and the amount of $BF_3$ was 0.1 or 0.15 mole per mole of 5,6-dimethyltetralin. Vapor phase chromatographic analyses of the products were as follows:

| $BF_3$/5,6-DMT* M/M | Time, min. | Product Composition, wt. percent | | |
|---|---|---|---|---|
| | | 5,6-DMT | 6,7-DMT | 5,7-DMT |
| 0.1 | 300 | 14 | 81 | 5 |
| 0.15 | 43 | 12 | 29 | 59 |
| 0.15 | 210 | 0 | 8 | 92 |

*Dimethyltetralin.

Examination of the data shown above indicates that $HF-BF_3$ is not a satisfactory catalyst for the isomerization of 5,6-dimethyltetralin to 6,7-dimethyltetralin while activated aluminum chloride or aluminum bromide is satisfactory below 50° C.

As stated previously the product of this isomerization is useful for the preparation of pyromellitic acid or the preparation of 2,3-dimethylnaphthalene which can be oxidized to 2,3-benzene dicarboxylic acid. 6,7-dimethyltetralin containing about 15% of 5,6-dimethyltetralin can be oxidized with nitric acid to yield a mixture of pyromellitic acid and mellophanic acid which can be readily separated based upon their difference in water solubility. However, the presence of 5,7-dimethyltetralin in the oxidation charge results in the formation of 1,2,3,5-benzene tetracarboxylic acid which contaminates both products when the water separation method is used.

Dehydrogenation of the mixed dimethyltetralins formed in Example I was carried out at 380° C. by passing a 40% solution of the tetralins in heptane over a commercial platinum-on-alumina catalyst containing 0.6% platinum at atmospheric pressure in a stream of hydrogen. A space rate of 1.3 was used. The product after removal of heptane was found to contain 83.5% 2,3-dimethylnaphthalene and 16.5% 1,2-dimethylnaphthalene. The 2,3-dimethylnaphthalene is separated by crystallization at 0–20° C. in the presence of the heptane solvent. By dissolving the filter cake in methanol and recrystallizing 2,3-dimethylnaphthalene of 99+% purity is obtained.

Alternatively, the dimethyltetralin product of Example I can be dehydrogenated at 50–100 p.s.i.g. at 450° C., a space rate of 3 and a hydrogen flow of 5000 s.c.f./b. using the platinum-on-alumina catalyst.

The isomerization of 5,6-dimethyltetralin to 6,7-dimethyltetralin in high yield and in the absence of by-products was unexpected. Under the conditions used the product appears to result from the isomerization of the saturated ring of 5,6-dimethyltetralin whereby the bond between the carbon in the 4-position of the tetralin ring becomes attached to the carbon in the 8-position and thus forming 6,7-dimethyltetralin instead of a shift of the methyl groups which would produce 5,7-dimethyltetralin as a major product.

What is claimed is:

1. Method of isomerizing 5,6-dimethyltetralin which comprises contacting said tetralin with an aluminum chloride or bromide catalyst at a temperature in the range of 0–70° C. whereby 6,7-dimethyltetralin is formed as isomerization product.

2. Method according to claim 1 wherein a mixture of 6,7-dimethyltetralin and 5,6-dimethyltetralin is obtained from the isomerization, said mixture is dehydrogenated to obtain a mixture of 2,3-dimethylnaphthalene and 1,2-dimethylnaphthalene, and 2,3 - dimethylnaphthalene is then selectively crystallized from the last-named mixture.

3. Method of producing 2,3-dimethylnaphthalene from 1,2-dimethylnaphthalene which comprises partially hydrogenating 1,2-dimethylnaphthalene in the presence of a hydrogenation catalyst to form a mixture of 1,2-dimethyltetralin and 5,6-dimethyltetralin, fractionally distilling said mixture to obtain a fraction rich in 5,6-dimethyltetralin, and treating said fraction in accordance with the procedure of claim 2 to obtain 2,3-dimethylnaphthalene.

4. Method according to claim 3 wherein said mixture from the partial hydrogenation step also contains unreacted 1,2-dimethylnaphthalene and in the fractional distillation step is separated into (a) a fraction mainly boiling in the range of 230–250° F., rich in 1,2-dimethyltetralin and containing a minor amount of 5,6-dimethyltetralin, (b) a fraction mainly boiling in the range of 250–255° F., rich in 5,6-dimethyltetralin, and (c) a residue fraction containing unconverted 1,2-dimethylnaphthalene, and utilizing fraction (b) as the said fraction from which 2,3-dimethylnaphthalene is obtained.

5. Method according to claim 1 wherein said temperature range is 20–40° C.

6. Method according to claim 2 wherein said temperature range is 20–40° C.

7. Method according to claim 3 wherein said temperature range is 20–40° C.

References Cited

UNITED STATES PATENTS

| | | | |
|---|---|---|---|
| 2,885,451 | 5/1959 | Linn | 260—668 |
| 3,109,036 | 10/1963 | Suld et al. | 260—668 |
| 3,113,978 | 12/1963 | Derrig et al. | 260—668 |

DELBERT E. GANTZ, *Primary Examiner.*

CURTIS R. DAVIS, *Assistant Examiner.*

U.S. Cl. X.R.

260—674